United States Patent [19]

Morales

[11] Patent Number: 4,956,234
[45] Date of Patent: Sep. 11, 1990

[54] FOAMED PVC PNEUMATIC BALL

[75] Inventor: Jorge L. Morales, Guadalajara, Mexico

[73] Assignee: Industrias Salver, S.A. de C.V., Jalisco, Mexico

[21] Appl. No.: 148,529

[22] Filed: Jan. 26, 1988

[30] Foreign Application Priority Data

Jan. 28, 1987 [MX] Mexico ............................ 5069

[51] Int. Cl.⁵ .................. A63B 41/00; B29C 67/22
[52] U.S. Cl. ............................... 428/36.5; 428/12; 264/45.7; 264/51; 264/DIG. 60
[58] Field of Search .............. 264/45.7, 54, DIG. 60, 264/45.5, 51; 428/12, 36.5; 273/DIG. 5

[56] References Cited

U.S. PATENT DOCUMENTS

| | | | |
|---|---|---|---|
| 2,473,722 | 6/1949 | Nelson | 264/DIG. 60 |
| 2,484,397 | 10/1949 | Barton | 264/54 X |
| 2,525,880 | 10/1950 | Feldman | 264/DIG. 60 |
| 2,525,965 | 10/1950 | Smith | 264/DIG. 60 |
| 2,743,931 | 5/1956 | Pooley et al. | 264/54 X |
| 2,760,775 | 8/1956 | Tipton | 273/DIG. 5 |
| 2,904,522 | 9/1959 | Catlin et al. | 273/DIG. 5 |
| 3,040,384 | 6/1962 | Whittington | 264/DIG. 60 |
| 3,095,260 | 6/1963 | Ferriot | 264/DIG. 60 |
| 3,319,376 | 5/1967 | Doppelt et al. | 264/DIG. 60 |
| 3,432,581 | 3/1969 | Rosen | 264/54 X |
| 3,541,192 | 11/1970 | Shapero et al. | 264/45.5 |
| 3,642,965 | 2/1972 | Nuttall et al. | 264/DIG. 60 |
| 3,852,389 | 12/1974 | Adler et al. | 264/54 X |
| 3,914,361 | 10/1975 | Shiina et al. | 264/45.7 X |
| 3,937,447 | 2/1976 | Alwes et al. | 264/54 |
| 3,972,975 | 8/1976 | Noda | 264/DIG. 60 |
| 4,070,434 | 1/1978 | Noda | 273/DIG. 5 |
| 4,079,107 | 3/1978 | Brunner et al. | 264/DIG. 60 |
| 4,154,789 | 5/1979 | Delacoste | 264/DIG. 60 |
| 4,238,537 | 12/1980 | Kerr | 273/DIG. 5 |

FOREIGN PATENT DOCUMENTS

| | | | |
|---|---|---|---|
| 57-208222 | 12/1982 | Japan | 264/45.7 |
| 1200827 | 8/1970 | United Kingdom | 264/45.7 |

Primary Examiner—Jan H. Silbaugh
Assistant Examiner—Allan R. Kuhns
Attorney, Agent, or Firm—Fleit, Jacobson, Cohn, Price, Holman & Stern

[57] ABSTRACT

A low-pressure inflatable article, made by rotomolding of polyvinyl chloride materials, featuring a lower weight as compared to similar articles made of the same material as well as improved physical characteristics which permit inflation of the article without the need for any inflation mechanical device, such as inflation with the mouth.

4 Claims, 1 Drawing Sheet

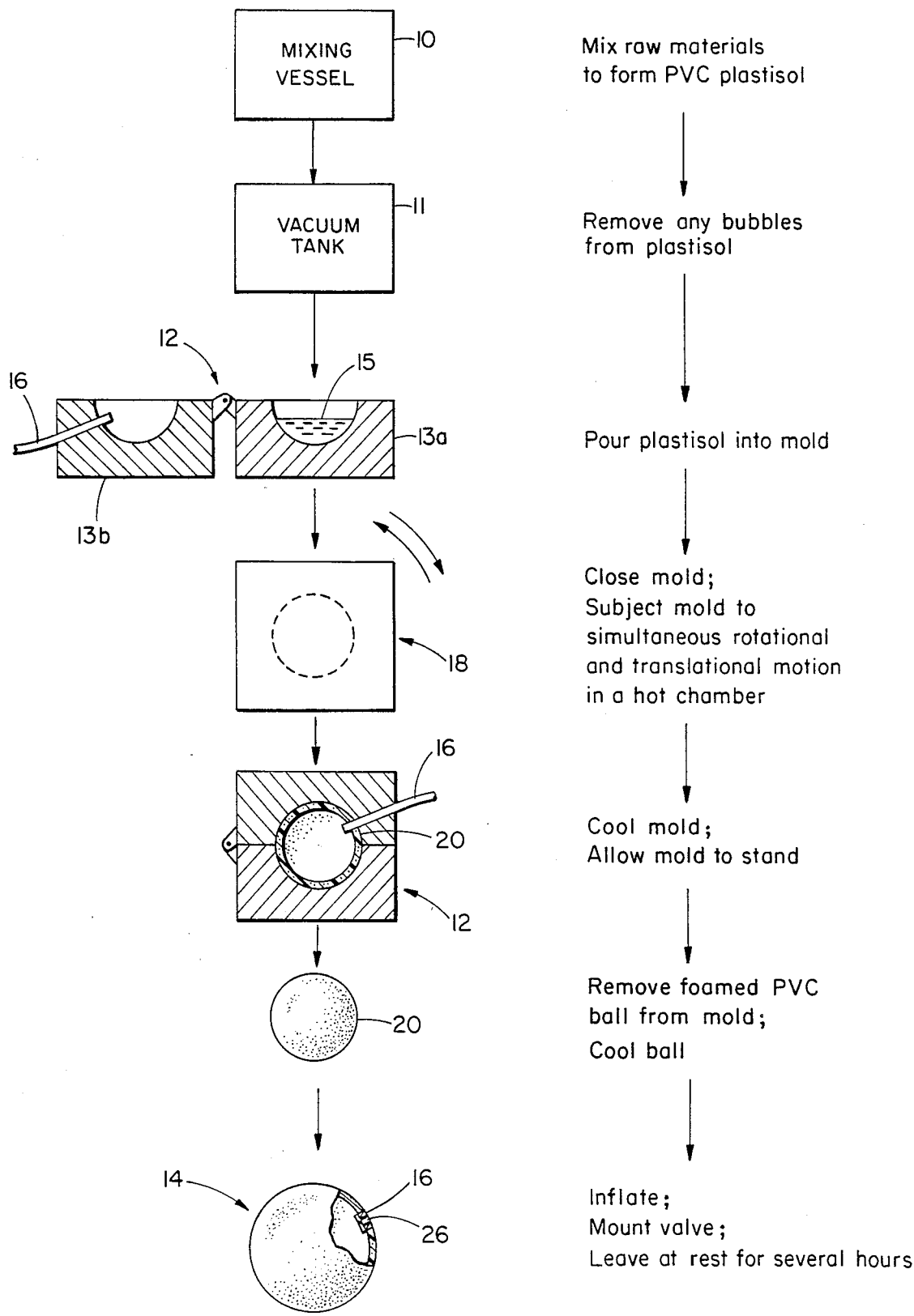

FOAMED PVC PNEUMATIC BALL

SUMMARY OF INVENTION

In the prior art it is common to make PVC articles; in the case of balls, they are sold to the public in an inflated condition and they are shipped in this condition, thus creating a problem in the storage and transportation of these articles. The nature of these articles is such that they have to be sold at very low prices since they are simple articles and there is a high output of balls throughout the world.

The above situation discussed in connection with the volume the balls occupy during their storage and transportation is also applicable to the display thereof in retail outlets, since they are displayed in an inflated condition which means they are exposed to deterioration and puncture either by error or on purpose with the resulting losses which directly or indirectly impact the retail price.

On the other hand, it is common that once the ball has deflated through a valve, it is rather difficult to inflate the ball again, since a special valve is obviously necessary for this purpose as well as a pump; however, in the case of inexpensive PVC balls they are seldom inflated again; rather, they are disposed of and the consumer public normally purchases another inexpensive PVC ball.

It is clear that depending on the use or sport for which the ball is intended, it will be necessary that the ball presents certain consistency and resists certain pressure; however, up to this date and generally, balls are made of PVC materials of the same physical characteristics, there being no product which is inflatable without the use of special devices or equipment, with a weight and consistency suitable for use by infants, besides permitting substantial savings in raw materials which, in the present invention can be of up to 50% as compared to prior art balls.

This application overcomes the disadvantages of the prior art balls, but also offers an article with characteristics which are different from those of similar products, such as a soft consistency which makes the ball suitable for infants.

An object of the invention is to make inflatable articles with dimensions equivalent to those of the prior art but with a savings in raw materials of up to 50% or more.

It is another object of the invention to make an inflatable article such as a ball, by a rotomolding process using foamed PVC, which can be inflated without the use of an air pump or a valve.

It is still another object of the invention to make an inflatable article, such as a ball, which can be stored and shipped in a deflated condition and thereafter easily inflated.

The foregoing and other objects which will become apparent hereinbelow are fully attained in accordance with the present invention.

BRIEF DESCRIPTION OF THE DRAWING

In the drawing, the sole FIGURE shows schematically the process of the present invention.

BRIEF DESCRIPTION OF THE PREFERRED EMBODIMENT

Prior to the present invention, it has been a common practice to make inflatable articles of various types of a solid PVC layer, which is uniform throughout the article in order to guarantee that once it is inflated, the article will adopt a uniform shape according to the intended design.

Due to the thickness and physical properties of the raw materials used in the manufacture of said articles, they have a rather high consistency so that to obtain their maximum expansion upon introduction of air, in many cases the use of an air compressor or at least a mechanical air pump is necessary along with the use of special valves to facilitate the inflation of the articles.

One of said articles is a commonly-used ball or a sports ball, such as a volley ball, basket ball, and the like; however, the ball of the present invention is a common-use ball which does not require high pressure for being used. Notwithstanding the use of the balls, most of them are currently made by means of the so-called rotomolding process which consists of putting a suitable amount of PVC in a mold comprising two semi-spheres, inserting through an opening in one of the semi-spheres a small piece of hose or the like which will provide the space for the valve as well as for a valve reinforcement, the valve being mounted at a later time, the molds are closed and subjected to simultaneous rotational and translational motions within a hot chamber wherein the temperature of the PVC rises to about 220° C. for a suitable time, the molds being later forwarded to another chamber where they are cooled; the vulcanized articles are then removed, inflated to a suitable air pressure and finished as desired, for example adding colors or a design or pattern.

The above-described procedure has been widely used so far, with only slight variations depending on the physical properties of the raw materials used to manufacture the balls.

The raw material, see block 10 in the figure, for manufacturing balls according to the present invention is essentially PVC but with a specific formulation useful to achieve uniform foaming of the PVC within the molds during rotomolding process.

The formulation of the raw material in question is as follows: about 0.20 to 0.24% by weight of a foaming agent; about 0.20 to 0.24% by weight of a zinc oxide; about 0.20 to 0.24% by weight of a dispersing and coloring agent; about 0.65 to 0.69% by weight of an epoxy resin; about 40.5 to 44.84% by weight of an emulsion resin and about 50 to 57% of a primary plasticizer.

The above formulation permits the manufacture of a PVC article whose walls have tiny air chambers of a substantially uniform size and uniformly distributed throughout the PVC material, which has a finished appearance similar to that of leather; prior to this invention, such an inflatable article had not been achieved from such raw material and using a rotomolding process.

Even though various articles made out of a foamed PVC material are known, which are manufactured through various procedures whose differences are a function of the intended shape of the articles, the process of the present invention is limited to the specific application of manufacture of balls.

As mentioned hereinbefore, products made of foamed PVC materials are known in the market; however, they have been manufactured by means of a substantially mechanical process wherein a plastisol is liquified at high speeds and simultaneously mixed with high pressure air in order to achieve foaming in the plastisol. This process has the disadvantage that when the mechanical action of liquifying and air supply is stopped, the air bubbles contained in the plastisol will tend to move to the surface thereof, this resulting in the manufactured articles having parts of different densities. This is of course undesirable as to the appearance and quality of the articles.

The process of the present invention also avoids the problems derived from a mechanical processing of the raw materials since the foaming is achieved simultaneously with the manufacture of the ball, this resulting in a product with a high quality and uniform physical properties throughout its full thickness.

The process of the present invention involves certain changes in the traditional rotomolding process, since due to the physical properties of the raw materials employed certain variations regarding temperature, residence times in the mold and cooling must be observed.

The process applicable to the manufacture of the articles of interest can be briefly outlined as follows:

The ingredients of the above-described formulation are mixed in a suitable vessel 10, then passed to a vacuum tank 11, wherein any bubbles which may have formed during the mixture step are extracted. This formulation is a plastisol and is filtered and pigmented as necessary.

The pigmented plastisol 15 is poured into the molds 12, which are preferably made of a steel and aluminum alloy and are comprised of two semi-spheres 13a, 13b; one of the semi-spheres 13b carries a flexible PVC hose 16 or the like, to provide the space and a reinforcement for the valve which is mounted on the product later.

Said plastisol 15 is used in an amount of about 50% the normal amount employed heretofore for similar PVC products; the molds are closed and subjected to simultaneous rotational and translational motions in a hot chamber, the rotomolding see block 18 in the figure, at a temperature of about 220° C. during a period of about 4 minutes, after which the molds are cooled to about 75° C. for about 18 to 20 seconds, then standing for about 3 minutes in order to assure the completion of the reaction of the foaming materials.

Once the standing period is over, the articles 20 are removed from the molds and cooled; to this end they are inflated, with care not to apply an excessive air pressure to prevent deformation; then the valve or plug 26 is mounted and the articles 14 are left in rest for several hours so that the articles lose their "memory" and keep the dimensions in which they were molded.

The articles or balls, see product 14 in the figure, so produced can be later decorated with specific designs or patterns as is common in the field of manufacturing of PVC balls.

It should be noted that the foaming of the plastisol is effected upon subjecting the molds to a rotomolding process, thus assuring uniformity in the product; such uniformity being very difficult to achieve by means of other procedures.

The article obtained in this manner has a sufficiently elastic wall to permit inflation without the use of a compressor or a mechanical pump, being easily inflated by blowing with the mouth with the aid of a straw of the type commonly used for liquids.

Such an inflated product can rebound or be handled as any similar prior art article even though the air pressure within the same is much lower than that encountered in prior art articles.

Since no device is required to inflate the articles of the present invention, they can be shipped, displayed and sold in a deflated condition, this being a great advantage over prior art balls.

Despite the light weight of the balls of the present invention, their inflated condition is assured since their walls are totally impervious to air notwithstanding the physical properties of the walls thereof which, as mentioned hereinbefore, are formed of a PVC material with a great number of tiny cells or air bubbles. The inflated condition in the balls of the present invention is permanent since the air pressure within the balls of the present invention is permanent since the air pressure within the balls is much lower than that of prior art balls.

It will be clear that the objects of the invention have been attained and that the invention can be modified or adapted without departing from the true scope and spirit of the invention which is only limited by the appended claims.

What is claimed is:

1. A hollow, foamed PVC pneumatic ball, made in molds by a rotomolding process consisting of: pouring a PVC composition in the molds in an amount sufficient to obtain a finished ball with a suitable wall thickness; inserting in the molds, to provide for forming an opening intended for a valve, a PVC flexible hose; closing the molds and subjecting the same to a simultaneous rotational and translational movement within a hot chamber at a temperature of about 220° C. for about 4 minutes; cooling the molds to a temperature of about 75° C., and permitting them to stand for about 3 minutes; removing a foamed ball from the molds; inflating the foamed ball to a suitable air pressure to prevent deformation of the ball; and then permitting the ball to stand until the ball loses its elastic memory; the ball having a wall of uniform thickness with evenly distributed cells throughout the wall; the PVC composition comprising about 0.20 to 0.24% by weight of a foaming agent; about 0.20 to 0.24% by weight of a zinc oxide; about 0.20 to 0.24% by weight of a dispersing and coloring agent; about 0.65 to 0.69% by weight of an epoxy resin; about 40.5% to 44.84% by weight of an emulsion resin; and about 50 to 57% by weight of a primary plasticizer; and the PVC composition being foamed simultaneously with the rotomolding process, the foaming being such that the ball has a soft and elastic consistency permitting inflation with the mouth using a straw inserted through a valve in the wall of the ball.

2. A foamed PVC pneumatic ball according to claim 1, wherein the finished product has a smooth and evenly foamed wall.

3. A process of making a hollow foamed PVC pneumatic ball wherein a PVC composition is foamed in molds by a rotomolding process consisting of: pouring a PVC composition comprising 0.20 to 0.24% by weight of a foaming agent; about 0.20 to 0.24% by weight of a zinc oxide; about 0.20 to 0.24% by weight of a dispersing and coloring agent; about 0.65 to 0.69% by weight of an epoxy resin; about 40.5 to 44.84% by weight of an emulsion resin; and about 50 to 57% by weight of a primary plasticizer in the molds in an amount sufficient to obtain a finished ball with a suitable wall thickness; inserting in the molds, to provide for forming an opening intended for a valve, a PVC flexible hose; closing the molds and subjecting the same to a simultaneous rotational and translational movement within a hot chamber at a temperature of about 220° C. for about 4 minutes; cooling the molds to a temperature of about 75° C., and permitting them to stand for about 3 minutes; removing a foamed ball from the molds; inflating the foamed ball to a suitable air pressure to prevent deformation of the ball; and then permitting the ball to stand until the ball loses its elastic memory.

4. A process according to claim 3, wherein the finished product has a smooth and evenly foamed wall.

* * * * *